C. G. ETTE.
TRAFFIC DIRECTING SIGNAL FOR VEHICLES.
APPLICATION FILED DEC. 10, 1919.
1,358,367.
Patented Nov. 9, 1920.
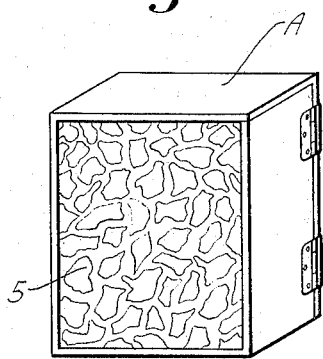
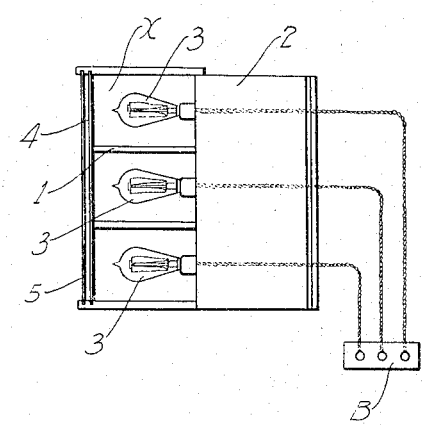
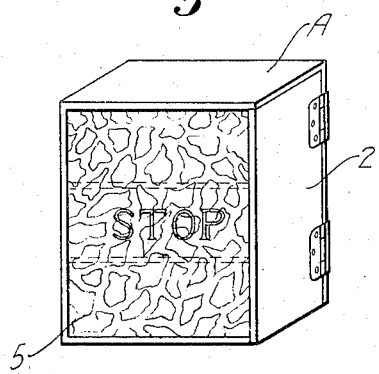
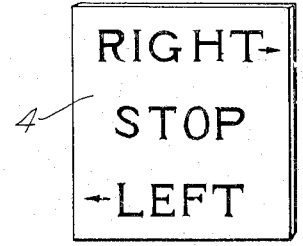
INVENTOR
Charles G. Ette.
BY
Bakewell & Church
ATTORNEY

UNITED STATES PATENT OFFICE.

CHARLES G. ETTE, OF ST. LOUIS, MISSOURI.

TRAFFIC-DIRECTING SIGNAL FOR VEHICLES.

1,358,367.  Specification of Letters Patent.  Patented Nov. 9, 1920.

Application filed December 10, 1919. Serial No. 343,875.

*To all whom it may concern:*

Be it known that I, CHARLES G. ETTE, a citizen of the United States, residing at St. Louis, Missouri, have invented a certain new and useful Improvement in Traffic-Directing Signals for Vehicles, of which the following is a full, clear, and exact description, such as will enable others skilled in the art to which it appertains to make and use the same.

This invention relates to traffic directing signals for automobiles and similar vehicles, of the kind in which the operator in charge of the vehicle can indicate a proposed change in the direction or speed of travel of the vehicle, as, for example, that the vehicle will turn to the right or to the left or stop.

The main object of my invention is to provide an efficient traffic directing signal for vehicles that is inexpensive to manufacture, not liable to rattle or get out of order when in use and of such construction that the indicating devices of same are normally hidden from view but can be rendered operative at the will of the operator in charge of the vehicle, so as to be visible at night or in the day time when the sun is shining brightly.

Another object is to provide a traffic directing signal for vehicles that has no moving parts and which is equipped with one or more indicating devices, means for illuminating one or the other of said devices and a screening means for said devices that normally hides them from view, even when the sun is shining brightly, but which permits the selected device to be readily seen when said selected device is illuminated. Other objects and desirable features of my invention will be hereinafter described.

To this end I have devised a traffic directing signal for vehicles that comprises a plurality of indicators or indicating devices that indicate or represent proposed changes in the direction or speed of the vehicle, a means that normally hides said indicating devices from view, and means for enabling any one of said devices to be rendered operative without moving the selected device or the means that normally hides the indicating devices from view. The complete signal preferably comprises two sets of similar indicators or indicating devices arranged so that they can be seen from the front and from the rear of the vehicle on which the signal is used and a switch under control of the operator in charge of the vehicle for controlling electric circuits equipped with lighting units that illuminate said indicating devices. The indicating devices of each set are preferably arranged in a separate housing or casing, one casing being arranged at the front of the vehicle and the other arranged adjacent the rear of the vehicle, but, if desired both sets of indicating devices may be arranged in a housing or casing which is so positioned on the vehicle that one set of indicating devices can be seen from the front of the vehicle and the other set from the rear of the vehicle. The indicators or indicating devices may consist of words, symbols, sentences or any other preferred indicia, and each set of indicators or indicating devices may comprise any preferred numbers of indicators.

I have herein illustrated one simple form of the invention, as consisting of a casing having its interior divided into a number of separate and distinct compartments, an indicating device associated with each of said compartments, means for enabling any one of said indicating devices to be illuminated without illuminating the other indicating devices of the set, and a screen that normally hides the indicating devices from view, but which will render visible the selected indicating device that is illuminated. I have not illustrated the two casings that are arranged at the opposite ends of the machine, as both of the casings and the indicating devices that coöperate with same are of the same construction.

Figure 1 of the drawings is a perspective view of my improved traffic directing signal.

Fig. 2 is an end view of same, showing the door or hinged end wall of the casing open.

Fig. 3 is a perspective view of the signal, showing one of the indicating devices operative; and Fig. 4 is a perspective view of one means that can be used to form the indicating devices of the signal.

Referring to the drawings which illustrate one form of my invention, A designates a casing or housing of any preferred shape or construction whose interior is divided into a number of compartments $x$ by partitions 1, the casing A herein shown consisting of a rectangular shaped metal box provided with a vertically-disposed rear wall, horizontally-disposed top and bottom walls and two vertical end walls, one of which, indicated by the reference character 2, is hinged so that it will form a door for the casing. A lighting unit, preferably an incandescent lamp 3, is arranged in each compartment *x* of the casing A, and an indicator or indicating device is associated with each of said compartments, the indicating devices herein illustrated consisting of the word "Right," with a small arrow pointing to the right, the word "Left," with a small arrow pointing to the left, and the word "Stop" arranged between the words "Right" and "Left," as shown in Fig. 4. However, any preferred words, symbols or indicia may be used, and it is immaterial how said indicating devices are disposed in the casing A, so long as they are arranged in such a manner that they will be illuminated when the lighting units 3 that coöperate with same are operative. One convenient way of constructing the signal is to form the words, symbols or other indicia that constitute the indicating devices on a plate 4 of transparent or translucent material that is arranged in the casing A in such a manner that the indicating devices on said plate will be positioned in alinement with the compartments *x* of the casing A and in front of the lighting units 3 in said compartments, said words, symbols or other indicia being painted, printed or otherwise formed on the front or rear side of the plate 4. Instead of using a translucent or transparent plate having indicia formed thereon, a stencil plate may be used. When a stencil plate is used, namely a plate in which the words or symbols constituting the indicators are formed by holes or openings in the stencil plate, it is preferable to combine the stencil plate with a piece of translucent material so as to soften the light and prevent the lamp bulbs 3 from showing through the openings in the stencil plate when said lamp bulbs are lighted.

The indicating devices formed by the words on the plate 4 are normally hidden from view by a plate 5 that forms the front wall of the casing A, as shown in Fig. 1. Said plate 5 is preferably formed of glass of sufficient density to hide the indicating devices of the signal when the rays of the sun strike the plate 5, but which will permit said indicating devices to be seen through the plate 5 when said indicating devices are illuminated. I have found that glass of varying colors and varying density can be used successfully to form the plate 5 which constitutes the screen or the signal, but I do not wish it to be understood that my broad idea is limited to a signal in which the screen is formed from plain glass or colored glass, as my broad idea contemplates using any material that has sufficient density to normally hide the indicating devices from view, even when the sun is shining brightly, but which will permit the selected illuminated indicating device to be readily seen at night or in the day time when the sun is shining brightly. I have found that excellent results can be obtained with red, green or blue glass, and in practice I prefer to use a glass plate 5 whose outer surface is roughened slightly so as to eliminate an intense glare when the rays of the sun strike said plate. The interior of the compartments *x* are preferably coated with black japan so as to further reduce the possibility of the indicating devices being seen when the sun is shining brightly and the lighting units 3 are inoperative.

The plates 4 and 5 can be held in operative position in the casing A in various ways without departing from the spirit of my invention, and instead of using plates that are common to all of the compartments *x* in the casing A, separate plates can be used for each compartment of the casing. In the form of my invention herein illustrated the plates 4 and 5 are slidingly mounted in grooves formed in the top and bottom walls of the casing A, as shown in Fig. 2, the plate 4 being arranged a slight distance to the rear of the plate 5 so that there will be no reflection from the inner plate 4 when the sun's rays strike the outer plate 5, as would be the case if the plates were in contact. The screen lighting units 3 are arranged in separate and distinct electric circuits, and a switch B, shown diagrammatically in Fig. 2, is provided for enabling the operator in charge of the vehicle to select and render operative any one of the indicating devices on the plate 4.

A traffic directing signal of the construction above described is inexpensive to manufacture, and it is not liable to get out of order when in use, on account of the fact that it has no moving parts. Still another desirable feature of such a signal is that the indicating devices of same are normally hidden from view, thus avoiding confusion to the public, as would be apt to occur if the indicating devices were normally exposed to view, and rendered operative prior to a change in the direction of travel or the speed of the vehicle. In other words, if the signal were not provided with a screen 5 for the indicating devices, a pedestrian or motorist who looked at the vehicle on which the signal is used would see all three of the indicating devices exposed to view, and accordingly, might become confused or misinterpret the indicating device that the operator in charge of the vehicle renders operative before making a change in the direction or speed of the vehicle. However, in my improved signal there is no liability of the public misinterpreting the indicating device that is rendered operative, for normally the plate 5 that forms the front of the casing A is blank and it is only when the direction or speed of the vehicle is to be changed that one of the indicating devices appears to view through said plate.

Having thus described my invention, what I claim as new and desire to secure by Letters Patent, is:

1. A traffic directing signal for vehicles consisting of a casing whose interior is divided into a number of compartments, a lighting unit arranged in each of said compartments, a non-opaque plate provided with indicating symbols, corresponding in number to said compartments and arranged so that an indicating symbol is associated with each compartment and will be illuminated when the lighting unit in its coöperating compartment is lighted, and a screen in the front wall of the casing formed by a piece of colored glass provided with a roughened outer surface and spaced far enough in front of the indicating symbols to prevent reflection due to external light.

2. An illuminated warning sign, comprising a casing divided into several compartments, a translucent plate closing the front of said compartments and bearing the desired symbols, an electric lamp in each compartment, and a screen of colored glass in front of and spaced away from said plate to render the symbols invisible except when illuminated by the said lamps.

CHARLES G. ETTE.